United States Patent
Brunner et al.

(10) Patent No.: US 10,825,215 B2
(45) Date of Patent: Nov. 3, 2020

(54) METHOD AND APPARATUS FOR GENERATING AN OUTPUT IMAGE FROM A VOLUME DATA SET

(71) Applicants: Thomas Brunner, Nuremberg (DE); David Wenzel Kaltenbacher, Furtwangen (DE); Christoph Köhler, Fürth (DE); Bernd Schreiber, Forchheim (DE)

(72) Inventors: Thomas Brunner, Nuremberg (DE); David Wenzel Kaltenbacher, Furtwangen (DE); Christoph Köhler, Fürth (DE); Bernd Schreiber, Forchheim (DE)

(73) Assignee: Siemens Healthcare GmbH, Erlangen (DE)

( * ) Notice: Subject to any disclaimer, the term of this patent is extended or adjusted under 35 U.S.C. 154(b) by 265 days.

(21) Appl. No.: 15/914,267

(22) Filed: Mar. 7, 2018

(65) Prior Publication Data

US 2018/0260990 A1    Sep. 13, 2018

(30) Foreign Application Priority Data

Mar. 7, 2017   (DE) ................. 10 2017 203 702

(51) Int. Cl.
   *G06T 11/60*   (2006.01)
   *G06T 5/40*    (2006.01)
   *G06T 15/08*   (2011.01)

(52) U.S. Cl.
   CPC ............... *G06T 11/60* (2013.01); *G06T 5/40* (2013.01); *G06T 15/08* (2013.01)

(58) Field of Classification Search
   CPC ........... G06T 11/60; G06T 15/08; G06T 5/40
   See application file for complete search history.

(56) References Cited

U.S. PATENT DOCUMENTS

| | | | |
|---|---|---|---|
| 6,579,239 B1 | 6/2003 | Avinash et al. | |
| 8,047,992 B2* | 11/2011 | Hashimoto | A61B 8/14 382/128 |
| 2007/0038106 A1* | 2/2007 | Kim | G01S 15/8993 600/443 |
| 2010/0194867 A1* | 8/2010 | Bergman | G03B 15/02 348/54 |

(Continued)

FOREIGN PATENT DOCUMENTS

| | | |
|---|---|---|
| EP | 1832894 B1 | 5/2017 |
| JP | 2008245832 A | 10/2008 |

*Primary Examiner* — Wesley J Tucker
(74) *Attorney, Agent, or Firm* — Lempia Summerfield Katz LLC (57) ABSTRACT

A method and an apparatus for generating an output image from a volume data set that includes a plurality of voxels are provided. In the method, a rendered 2D image is generated from the volume data set by volume rendering. In order to generate an output image with adjusted brightness, which makes a manual readjustment of the brightness superfluous, an adjustment factor is determined based on a brightness value of pixels in the rendered 2D image. By multiplying a respective voxel brightness value of the voxels in the volume data set by the adjustment factor, a brightness-adjusted volume data set is generated. By volume rendering from the brightness-adjusted volume data set, the brightness-adjusted output image is generated.

17 Claims, 3 Drawing Sheets

(56) References Cited

U.S. PATENT DOCUMENTS

| | | | |
|---|---|---|---|
| 2010/0207954 A1* | 8/2010 | Kim | G09G 3/3406 345/589 |
| 2012/0087564 A1* | 4/2012 | Tsujita | A61B 8/466 382/131 |
| 2012/0314923 A1* | 12/2012 | Barnhorst | G06F 19/321 382/131 |
| 2014/0035910 A1* | 2/2014 | Wakai | A61B 8/5215 345/419 |
| 2015/0193961 A1* | 7/2015 | Nakagawa | G06T 19/00 345/424 |
| 2016/0225181 A1* | 8/2016 | Park | G06T 15/08 |
| 2019/0147639 A1* | 5/2019 | Sudarsky | G06T 15/08 345/424 |

* cited by examiner

METHOD AND APPARATUS FOR GENERATING AN OUTPUT IMAGE FROM A VOLUME DATA SET

This application claims the benefit of DE 10 2017 203 702.4, filed on Mar. 7, 2017, which is hereby incorporated by reference in its entirety.

BACKGROUND

The present embodiments relate to generating an output image from a volume data set that includes a plurality of voxels by volume rendering.

Generating from a volume data set a two-dimensional image that is suitable for display on a conventional screen but may depict a three-dimensional object is known. In connection with medical imaging data, for example, it is of particular significance and importance that details of the image may be detected particularly well. In conventional imaging methods, a brightness of the last image depicted is based, for example, on grayscale values of the voxels in the volume data set, on rendering parameters, and on a transmission- or transfer function that is used and that assigns color values to grayscale values. In order to achieve an improved result, strategies for the automatic adjustment of the transfer function and/or automatic windowing are used. However, it may often be observed with conventional methods that the rendered resulting or output image relating to a data set is too light or too dark, such that a subsequent adjustment of the brightness is necessary.

EP 1 832 894 A2 discloses a system and a method for automatic gain compensation based on image processing. An intensity or brightness is adjusted based on the intensities of the voxels in the input data.

JP 2008-245832 A describes a device and a method for displaying medical images. The aim thereof is to avoid impairing the detectability of an image if a further object is displayed. For example, a comment or a diagnostic result may be displayed in addition to the medical image. Using a control device, a display facility to adjust a luminance of the object that is shown in addition is activated.

U.S. Pat. No. 6,579,239 B1 discloses a system and a method for the automatic adjustment of brightness and contrast in images (e.g., in an ultrasound image). The contrast and the brightness are adjusted by the processing of global image element intensity data in order to develop a set of data that displays a histogram. An algorithm for filtering the image element intensity values as a function of certain properties of the histogram data is used. The algorithm is not intended to influence a near-field region of the ultrasound image.

SUMMARY AND DESCRIPTION

The scope of the present invention is defined solely by the appended claims and is not affected to any degree by the statements within this summary.

The present embodiments may obviate one or more of the drawbacks or limitations in the related art. For example, an image with improved brightness is generated and displayed without manual adjustment of the brightness.

In the method according to one or more of the present embodiments for generating an output image from a volume data set that includes a plurality of voxels, a rendered 2D image is generated from the volume data set by volume rendering. In order to avoid the necessity of a subsequent manual setting or adjustment of the brightness of the output image by a user or an operator, for example, an adjustment factor may be determined based on a brightness value of pixels in the rendered 2D image. Then, by multiplying a respective voxel brightness value of the voxels in the volume data set by the adjustment factor, a brightness-adjusted volume data set is generated. From this brightness-adjusted volume data set, the output image is then generated by volume rendering.

The volume data set may be a conventional volume image data set, for example, such as may be acquired or generated, for example, using a conventional computer tomograph, X-ray device, magnetic resonance tomograph, 3D-ultrasound device, or suchlike. That is, the volume data set may be generated from a respective raw data set, for example, using known 3D-reconstruction methods. This volume data set subsequently becomes available to carry out the present method.

The generation of the rendered 2D image from the volume data set by volume rendering may include automatic windowing, that is, automatic adjustment, setting, or selection of a window or interval from grayscale values that are to be used (e.g., windowing) and also an automatic adjustment of a transmission or transfer function. The transfer function is used to assign a color value to respective grayscale values of the individual voxels. According to this assignment or calculation of the color values, the pixels in the 2D image (e.g., the display thereof; the color values thereof) may be calculated. The relevant display values (e.g., the color values) of the pixels in the 2D image may therefore depend, for example, on the color values of the voxels that have been calculated beforehand using the transfer function; in addition, however, the relevant display values may also depend on the orientation of the volume data set and/or of further rendering parameters that may affect, for example, a shading, a transparency, and so on.

The rendered 2D image is an image or data set that may be output on a conventional display facility (e.g., a screen or a monitor) and depicted using the display facility. It is precisely this that is also done in conventional methods. Unlike the conventional methods, in one or more of the present embodiments, this rendered 2D image is not output onto a display facility or displayed using a display facility, but the aforementioned further process acts are first carried out in order to generate the output image. First, the output image is then output to a display facility, for example. The output image that has been generated may also be further processed in a different way.

The orientation of the volume data set may also be described by a perspective or a projection direction of the 2D image and indicates accordingly from which direction the rendered 2D image displays or depicts the volume data set. The 2D image may display an object that is described by the volume data set. The three-dimensional object is imaged onto or projected into a two-dimensional plane in order to allow a display on conventional display facilities or, for example, a printout on paper or on a slide, for example.

The 2D image is therefore ultimately constructed from or composed of two-dimensional pixels. The brightness of these individual pixels (e.g., therefore, the brightness of the 2D image overall) may depend, for example, on the volume rendering method used, on the orientation of the volume data set, and/or on further parameters or influencing factors. With the present method, all these influencing factors are advantageously acquired by using the brightness that results after the rendering of the 2D image as the basis of or foundation for adjusting the original volume data set.

The rendered 2D image therefore represents a provisional result or intermediate result, based on which the volume data set that serves as a starting point or entry date is adjusted. In the present method, therefore, using the 2D image that is therefore an intermediate result of the method, feedback takes place into the initial data (e.g., into the original volume data set). Since the resulting brightness values of the pixels in the 2D image do not only depend on the voxel brightness values or grayscale values of the voxels and/or on the transfer function, an improved brightness and consequently an improved display of the output image with enriched detail, which takes all the influencing factors into account, may advantageously be achieved.

The present method therefore represents a results-based stable algorithm for setting or adjusting the brightness of the output image and leads to a stable, improved brightness of the output image, which is individually applicable to the respective data, irrespective of the grayscale values of the voxels in the original volume data set. Using the present method, the brightness of the output image (e.g., a respective brightness value of pixels in the output image), which likewise ultimately involves a two-dimensional image, may advantageously also be set or regulated likewise irrespective, for example, of influencing factors such as an amount of a contrast agent used or a time when the raw data used as the basis of the volume data set were acquired in relation to a time of injection of the contrast agent. As a result thereof, an optimum brightness of the output image is provided in the resulting image, such that a subsequent manual setting or adjustment of the brightness is not necessary. As a result of this, a workflow may be improved.

To generate the 2D image and the output image, various volume rendering methods or processes, each of which may include a plurality of individual acts, may be used.

In the context of the present embodiments, the terms brightness and brightness value are to be interpreted and understood in broad general terms. This provides that the brightness or the brightness value may refer, for example, to the V value (e.g., lightness value, blackness value) in the HSV color model, the L value (e.g., lightness, relative brightness) in the HSL color model, the B value (e.g., brightness, absolute brightness) in the HSB color model, the I value (e.g., intensity, light intensity) in the ASI color model, the K value (e.g., key, black component) in the CMYK color model, the alpha value or alpha channel in the RGBA color model, an intensity or a subjective brightness, or may indicate the relevant value or be indicated by the relevant value. The brightness value may also be indicated using Hounsfield units on the Hounsfield scale (e.g., using a respective radio opacity). The voxel brightness value indicates the brightness or the brightness value of the respective voxel.

In addition to or as an alternative to simply multiplying the respective voxel brightness value by the adjustment factor, a different mathematical function or relationship may be provided.

In a variant, a brightness value of the pixels in the rendered 2D image may be determined. The adjustment factor is then calculated as the ratio of a preset target brightness value to the mean brightness value. In other words, the adjustment factor f may be determined as $f=b_{target}/b_{mean}$, where $b_{target}$ indicates the preset target brightness value and $b_{mean}$ is the mean brightness value detected in the pixels of the rendered 2D image. The mean brightness value may be calculated as an arithmetic mean, for example, or determined or calculated as a median of the brightness values of the pixels. Alternatively, other mean values or other methods for determining the mean brightness value may be used.

The specifying of the target brightness value allows the influencing of the present method or of the result (e.g., of the brightness of the output image). As a result thereof, the brightness of the output image can be adjusted to the situation as required, taking into account personal preferences and/or considering an external factor, such as, for example, a brightness of the surroundings or a property of a display device that is used, for example, by specifying a target brightness value that has been adjusted accordingly. The use of the mean brightness value and the calculation or definition of the adjusted value as a simple ratio advantageously allows a particularly simple and fast use of the method according to the present embodiments that may be carried out with little computation effort. As a result thereof, the brightness-adjusted or brightness-optimized output image may also be adjusted with minimum delay (e.g., in the case of extensive volume data sets).

In one embodiment, the target brightness value may be set automatically as a function of a type of the volume data set (e.g., selected from a predetermined number of different target brightness values). In other words, the target brightness value that is to be used may be set or selected autonomously (e.g., by a data processing unit, by which the method is carried out). For example, different brightness values that may be stored even before the start of the method in a storage facility may be preset by the manufacturer or by an operator. The unit is then accessed during the method. Both by specifying different target brightness values and by automatically setting or selecting the brightness values to be used without user input or user interaction during the method (e.g., during the execution or the running time of the method), an output image that is optimized with regard to the respective type of the volume data set may be generated in a particularly advantageous manner. Consequently, therefore, an efficient use of the method in various situations (e.g., for various types or kinds of volume data sets) is advantageously possible.

The type of the volume data set may be defined, for example, by the modalities used to obtain or acquire the volume data set or the raw data that form the basis of the volume data set. For example, different target brightness values may be set for X-ray, magnetic resonance tomography, angiography, or ultrasound volume data sets, and so on. In addition or alternatively, the type of the volume data set may be defined by an object described thereby or by an object represented thereby and/or a property of such an object. In other words, therefore, different target brightness values may be preset, for example, for volume data sets that show or characterize specific types of tissue, such as, for example, certain organs, bones, or other types of material or matter. In addition or alternatively, the type of the volume data set may likewise be determined by one or a plurality of settings or parameters of a data-capturing or acquisition device, by which the raw data that forms the basis of the volume data set have been captured or acquired. In addition or alternatively, the type of the volume data set may likewise be determined by a type of reconstruction or a reconstruction method by which the volume data set has been generated from the raw data that forms the basis thereof.

In addition or alternatively, the target brightness value may be determined as a function of one or a plurality of rendering parameters (e.g., preset, organ-preset) of the volume rendering. The parameters have been used to generate the rendered 2D image. Such rendering parameters may include, for example, details relating to ambient lighting, diffuse lighting, mirror reflection, brilliance, surface fitting or surface enhancement, and/or the like. Consequently, therefore, an optimum brightness of the output image may be provided automatically for different types or kinds of volume data sets and/or rendering methods. In one embodiment, the type of the volume data set and/or the rendering parameters used may be likewise automatically acquired or detected, such that, by avoiding the necessity of a relevant user input, the workflow may be further improved. For this purpose, automatic image recognition, image analysis, and/or evaluation of metadata relating to the volume data set, for example, may be provided.

In one embodiment, a histogram of the 2D image that characterizes the brightness values of the rendered 2D image may be generated and an adjustment factor based on the histogram may be determined. In other words, therefore, the brightness values of the pixels in the rendered 2D image are sorted according to brightness or are assigned to preset brightness values or brightness intervals (e.g., Bins). The histogram therefore represents a brightness distribution in the 2D image or indicates such a distribution. The histogram may advantageously represent a data set that is particularly easy to interpret, evaluate, and process. Since only values or data relevant to the brightness are therefore stored in the histogram, the adjustment factor may be determined therefrom in a particularly simple manner, as this factor affects the brightness only and leaves the respective color shades, for example, unchanged.

In one embodiment, the adjustment factor is determined based on the histogram such that as a result of multiplication by the adjustment factor, a preset portion of the pixels in the 2D image have at least one brightness that corresponds to a preset threshold value. By evaluating the histogram, it may be detected or determined what portion (e.g., how many) of the pixels in the 2D image have a brightness that is as great as or greater than the preset threshold value. The threshold value may be preset, set, or selected in a similar way to the target brightness value, which is why any repetition thereof is avoided and reference is made to the relevant passages. The threshold value may be preset as an absolute brightness value, for example. The portion of the pixels the brightness value of which is required to be as great as or greater than the threshold value may be preset as an absolute figure or as a percentage value.

Through the multiplication of the brightness values for the individual pixels by the adjustment factor, the histogram may be stretched or compressed until the condition is met whereby the preset portion of pixels has the desired brightness (e.g., at least one brightness that corresponds to the threshold value). By specifying the portion, a number of very bright pixels (e.g., with a brightness that at least corresponds to the threshold value) may be limited or restricted. As a result of this, an overexposure or exaggeration in the output image may advantageously be avoided. Alternatively, in a similar way, a target portion of pixels that are meant to have a brightness that is at most equal to the specified threshold or lower than the value may be preset.

In a variant, the threshold value and/or the portion of pixels may be automatically set as a function of a type of the volume data set (e.g., from a preset amount of different threshold values or portions). The threshold value and/or the portion may be set (e.g., selected) as a function of the rendering parameters used to generate the rendered 2D image. Likewise, a particularly simple, quick, and efficient adjustment of the brightness of the output image may be achieved as in the corresponding setting or selection of the target brightness value, through the automatic setting or selection of the threshold value and/or of the portion of pixels, without manual user inputs being necessary for this during the performance of the method. Reference is also made here to the explanations that may be transferred regarding the setting or selection of the target brightness value or of the dependence on the type of the volume data set, which is again applicable accordingly in order to avoid unnecessary repetition.

The use of the target brightness value and that of the histogram of the rendered 2D image therefore represent different methods for carrying out the process according to the present embodiments. The selection of which method is to be used may ensue either automatically or manually, for example, in a similar way to the setting or selection or dependence of the target brightness value and/or of the threshold value and/or of the portion of pixels.

In a further advantageous variant, after the generation of the output image, a modified output image may be generated from the brightness-adjusted volume data set without a further multiplication by the adjustment factor or by a different adjustment factor. In other words, therefore, the multiplication of the voxel brightness values may be carried out only once for the volume data set. This can be carried out the first time an output image is generated. Subsequently, each further output image may then be generated based on the already modified (e.g., brightness-adjusted) volume data set. As a result thereof, computation time and effort may be saved. In addition, disruptive deviations or fluctuations in the brightness of a plurality of consecutive images generated from the volume data set may be avoided.

A modified output image may be, for example, an output image that, in comparison with the first output image generated, has, for example, a different perspective or projection direction, a different zoom level, or such. In other words, therefore, in the case of continuous display (e.g., on a screen or monitor), modified (e.g., different) output images are generated when, for example, an operator moves, rotates, zooms, or otherwise influence the relevant view displayed. By generating the modified output images without making a fresh brightness adjustment of the volume data set or of the already previously brightness-adjusted volume data set, a particularly fluid and continuous display may therefore be facilitated. However, the brightness adjustment of the volume data set may be carried out again with a freshly determined adjustment factor if values that influence the display, such as the rendering parameters, for example, are modified.

In a further variant, a plurality of rendered 2D images with different projection directions are generated from the volume data set and the adjustment factor is determined based on the brightness values of the pixels in the plurality of 2D images. In other words, therefore, initially at least two (e.g., six) rendered 2D images are generated and then are all evaluated in order to determine the adjustment factor before the brightness adjustment of the volume data set is carried out. The adjustment factor may therefore be determined based on different orientations of the volume data set. A common adjustment factor may be determined based on the brightness values of the pixels in all the relevant 2D images that have been rendered for the determination of the adjustment factor. However, it may also be possible to determine a specific adjustment factor from each of the 2D images. This plurality of adjustment factors may then be averaged, for example, or combined together or absorbed into a single adjustment factor according to a different mathematical function, which is then used to adjust the brightness of the volume data set.

By taking into account a plurality of 2D images (e.g., a plurality of different orientations of the volume data set; a plurality of different perspectives or projection directions) and considering or evaluating the relevant brightness values, the relevant output image having an optimum brightness for only one orientation or projection direction may be avoided. For example, in the event that the target brightness value is used, the brightness values of the pixels in the plurality of 2D images will contribute to the mean brightness value. When determining the adjustment value based on a histogram, the histogram may include, for example, the brightness values of the pixels in the plurality of 2D images. In one embodiment, six different 2D images may be used, for example. The perspectives thereof may be in each case in pairs that are antiparallel or perpendicular to each other. In other words, a cube or cuboid that envelops the volume data set may be defined, and the perpendiculars of the cube or cuboid may be used as projection directions for the six 2D images. As a result thereof, advantageously, a display of the volume data set or of the relevant object with an adjusted brightness may be provided from all the basic spatial directions, irrespective, for example, of a shape of the volume data set or of an object described thereby, in a particularly simple and standardized manner.

In one embodiment, the method may be carried out and user in an iterative manner. At the same time, a second rendered 2D image may therefore be generated from the brightness-adjusted volume data set. The second rendered 2D image is likewise not transmitted to a display facility but is used as the basis for the determination of a second adjustment factor. The second adjustment factor may then be used to generate a second brightness-adjusted volume data set by multiplying the previously generated brightness-adjusted volume data set or the original volume data set or the relevant voxel brightness values by the second adjustment factor. Alternatively, the first adjustment factor or in each case the last adjustment factor, or the adjustment factor determined in the preceding iteration may likewise be corrected, taking into account the second or currently determined adjustment factor. In a corresponding manner, a plurality of iterations may then be carried out. As a result thereof, dynamic or complex influences on the resulting brightness values of the pixels in the rendered 2D image may be taken into account or compensated for. Yet, it may also be possible, for each iteration, for example, for a plurality of images to be used as the basis for determining the respective adjustment factor, and for each iteration, for one of the 2D images, some of the 2D images or all of the 2D images to be exchanged (e.g., replaced by new or other 2D images, with different projection directions). As a result thereof, it is optionally possible to ensure that as many as possible output images with different projection directions may be generated with optimum brightness without subsequent manual brightness adjustments.

An apparatus according to one or more of the present embodiments for generating an output image from a volume data set that includes a plurality of voxels encompasses a data processing unit that is equipped to generate a rendered 2D image from the volume data set by volume rendering. The data processing facility is equipped to determine an adjustment factor based on a brightness value of pixels in the rendered 2D image. The data processing unit is in addition equipped to generate a brightness-adjusted volume data set by multiplying a respective voxel brightness value of the voxels in the volume data set by the adjustment factor. The data processing unit is also equipped to generate the output image using volume rendering from the brightness-adjusted volume data set.

For this purpose, the data processing unit may include, for example, a processor unit (e.g., a processor) or a computation unit (e.g., a computer). The data processing unit may include an electronic storage facility and/or be configured to have access to a storage facility.

In one embodiment, the apparatus may be equipped to carry out at least one embodiment of the method.

In a variant of the apparatus, the apparatus includes a control element and is equipped to alter the adjustment factor in response to an activation of the control element in accordance with the activation. In other words, as a result thereof, a manual influencing or setting of the adjustment factor by an operator may be provided or may ensue. The control element may be, for example, a slide control, a setting wheel, a push button, or suchlike. Likewise, the control element may be configured to have a physical and/or virtual form or may be provided as part of a virtual user interface.

A further aspect of the present embodiments is a storage medium with a program code that represents or encodes the process acts of at least one embodiment of the method such that when the program code is carried out by a calculation unit (e.g., the calculation unit in the apparatus according to the present embodiments), the method is carried out.

In the context of the present embodiments, the reference to the "pixels" in the 2D- or output image and the reference to the "voxels" in the volume data set may be in each case the total number of pixels or voxels. In one embodiment, the reference to the "pixels" in the 2D- or output image and the reference to the "voxels" in the volume data set may be in each case only a subset of the pixels or voxels. For example, only one such subset may be relevant and used accordingly if only one section of the volume data set, of the 2D image, and/or of the output image is processed or observed. Pixels and/or voxels may be excluded from the calculation or processing, if, for example, the pixels and/or voxels do not contribute to the respective result or if the pixels and/or voxels influence the result in an undesirable manner. For example, the voxels or pixels that represent artifacts, image errors, or suchlike may be excluded. As a result thereof, a computing effort may be reduced, and an improved output image may be generated.

The properties and developments of all the aspects of the present embodiments described in the aforementioned and hereinafter (e.g., of the method, the apparatus, and the storage medium according to the present embodiments), and also the corresponding advantages are in each case reciprocally transferable by analogy between the various aspects. This also applies to the components and the facilities that are used or may be used to carry out the method according to the present embodiments. For this reason, the present description avoids a respective explicit individual formulation of each property, of each development, and of each advantage for all aspects of the present embodiments.

DETAILED DESCRIPTION

Figure 1:
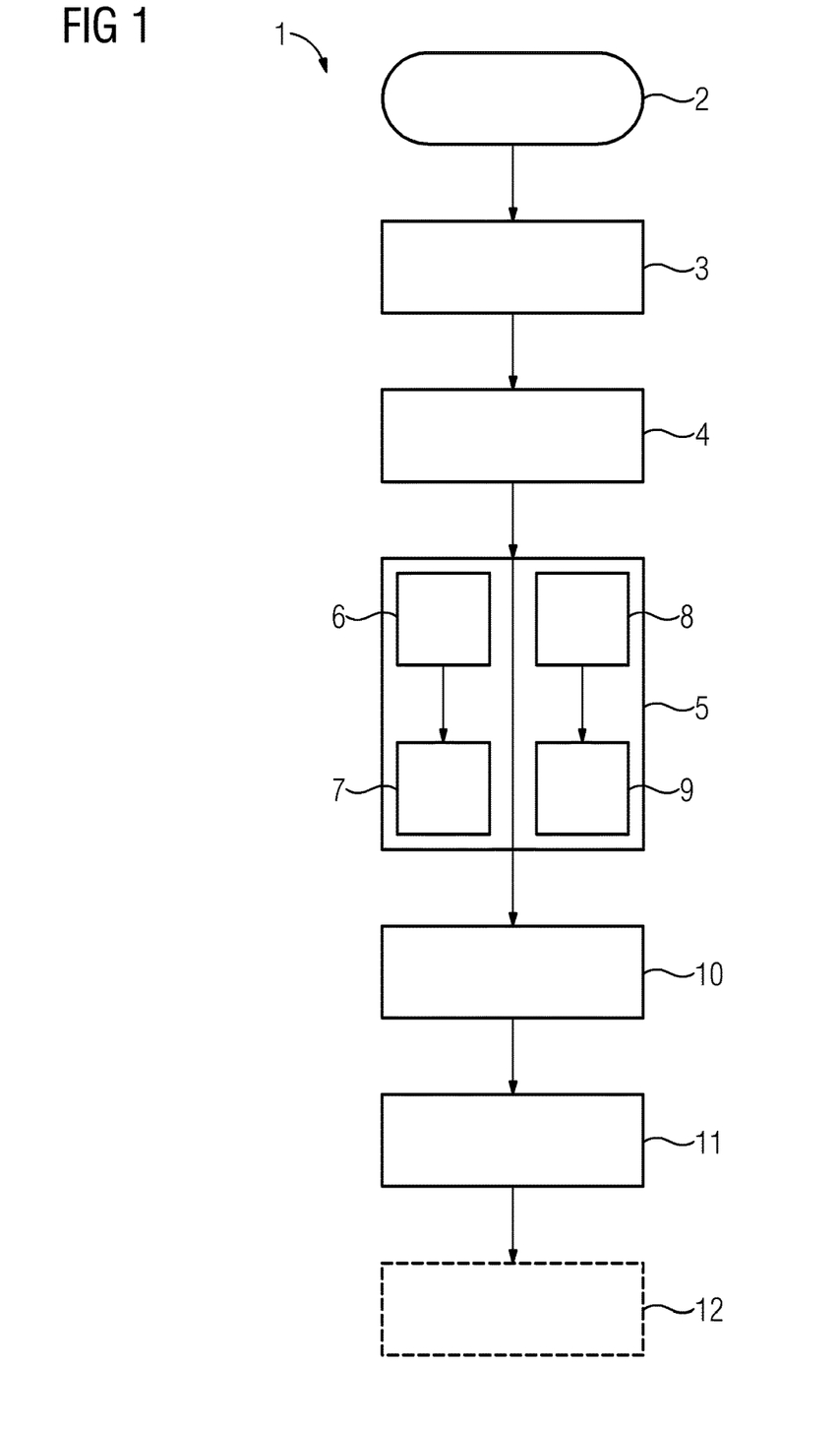
FIG. 1 shows a diagram of a workflow of one embodiment of a method for generating an output image from a volume data set.

FIG. 1 shows, by way of example, in diagram form, a workflow of a method for generating an output image 22 (cf. FIG. 5) from a volume data set that includes a plurality of voxels.

The method begins with act 2, in which the method is started by, for example, activating a relevant apparatus for carrying out the method. For example, the volume data set may also be provided to the apparatus. In the present case, the volume data set may be a data set that has been acquired or generated using a medical imaging method. The data set includes a plurality of voxels and is reconstructed by a known reconstruction method, for example, from raw data supplied by an appropriate detector. The volume data set can include, for example, $512^3$ or $1024^3$ voxels. In a typical scenario, the volume data set may describe, for example, an organ or part of an organ or, for example, blood vessels or suchlike.

In a subsequent process act 3, the specifying or setting of rendering parameters ensues, for example, by selecting a preset of settings. In this way, it is possible to establish or determine how a two-dimensional image that may be displayed on conventional display facilities such as, for example, screens or monitors or projection facilities (e.g., a side- or cross-sectional view of the volume described by the volume data set) is generated from the volume data set, which has a three-dimensional structure. This generation of the 2D image from the volume data set is carried out in a subsequent process act 4. In process act 3 or in process act 4, an orientation of the volume data set or a view- or projection direction, in which the 2D image is intended to be displayed, may, for example, also be established. A plurality of 2D images that may have different projection directions, for example, may also be generated, and accordingly, may therefore correspond to different directions of view onto the volume data set or different orientations of the volume data set. Both the specification of the rendering parameters in process act 3 and also the specification of the orientation of the volume data set in process act 3 or 4 may be carried out by an operator or by the apparatus or automatically. For automatic operation, standard or default values may be used, for example, and/or an automated evaluation of the data set, (e.g., of the metadata linked to the volume data set) for example, may be used.

To generate the 2D images from the volume data set, different volume rendering methods may also be used in conventional image generation methods. In conventional methods, the resulting brightness of each pixel of the 2D image that has been generated is a direct result of a grayscale value of the voxels in the volume data set that contribute to this pixel, of the rendering parameters used, and of the strategies used for automatic adjustment of a transfer function that assigns color values to the grayscale values. This often leads to a 2D image, the brightness of which is too high or too low to make interesting or relevant details detectable. To solve this problem, the present embodiments provide that the 2D image generated is not supplied to a display facility as with conventional methods.

Instead, in a subsequent process act 5, an adjustment factor for the adjustment of the brightness based on the 2D image that has been generated or of the 2D images that have been generated is determined. For this purpose, in a process act 6, for example, a mean brightness value of all the pixels in the 2D image or 2D images generated in process act 4 is calculated. Subsequently, in a process act 7, the adjustment factor is then calculated as a ratio of a preset target brightness value to the mean brightness value that has been calculated. The target brightness value may be determined automatically, for example, by a type of the volume data set or selected from a preset number of target brightness values.

Figure 2:
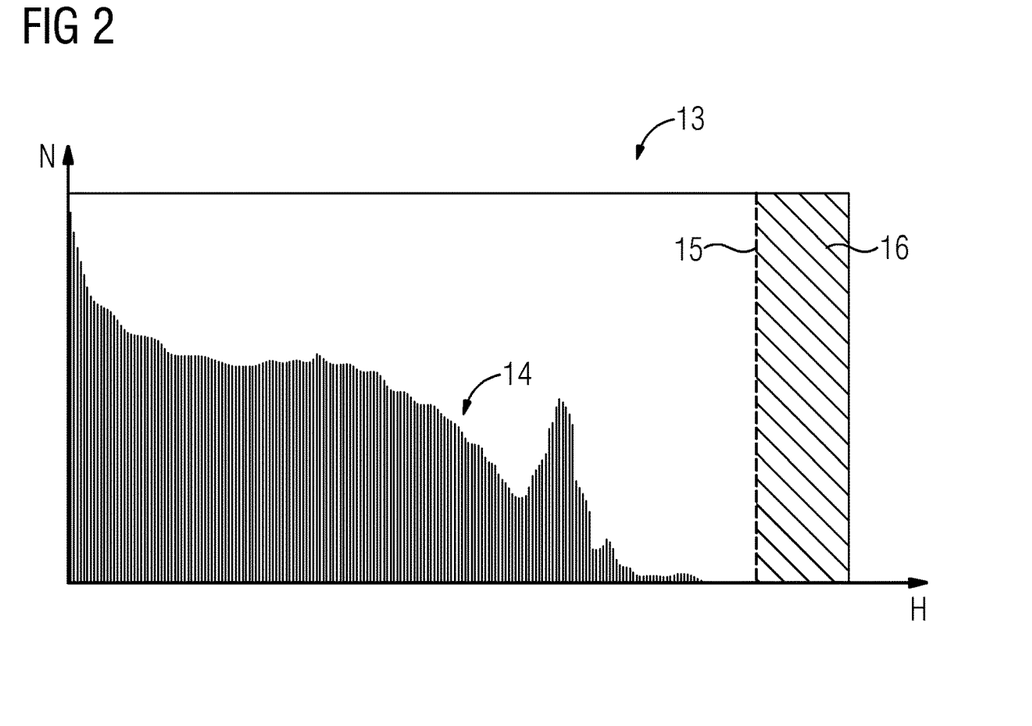
FIG. 2 shows an exemplary histogram of a 2D image generated from a volume data set.

As an alternative to process acts 6 and 7, the adjustment factor may also be determined, for example, based on a histogram 13 (cf. FIG. 2). For this purpose, in act 8, a histogram 13 of the 2D image generated or of the 2D images generated in act 4 may be created. Such a histogram 13 is explained in connection with FIGS. 2 and 3. Based on the histogram 13, in a process act 9, the adjustment factor is determined such that a preset portion of the pixels in the 2D image or 2D images, on which the histogram 13 is based, have a brightness that is greater than or equal to a preset threshold value 15 (cf. FIGS. 2s and 3). Both the portion of pixels and also the threshold value 15 may be determined or selected automatically, for example, by analogy with the target brightness value as a function of the type of the volume data set. It may likewise be possible, however, for the target brightness value or the threshold value 15 and/or the portion of pixels to be preset, set, or adjusted by an operator. Irrespective of which practical method is used, the adjustment factor is therefore determined in process act 5.

The adjustment factor is determined by an evaluation of the rendered 2D image generated from the volume data set and not, for example, directly from the volume data set or, for example, from a histogram of the volume data set. As a result thereof, the necessary computation effort for determining the adjustment factor may be limited, and all the influencing factors that affect the brightness of the 2D image generated, combined in a simple and effective manner, may be taken into account in the determination of the adjustment factor.

In a subsequent process act 10, the adjustment factor is then applied to the volume data set. The brightness values of the voxels in the volume data set (e.g., the voxel brightness values) are multiplied by the adjustment factor. As a result of this, a brightness-adjusted volume data set is generated.

Subsequently, in a process act 11, likewise using known volume rendering methods from the brightness-adjusted volume data set, a two-dimensional output image 22 is generated. This output image 22 is therefore generated in a similar manner as in the 2D image generated in process act 4, but unlike this, originating from the brightness-adjusted volume data set. By the method described, the brightness of the output image 22 is therefore set based on a preset target value (e.g., the target brightness value or the threshold value 15 and the portion of pixels with brightness above the threshold value 15). The brightness of the output image 22 is therefore not directly determined by the grayscale values of the volume data set, but is based on the brightness of the pixels in the 2D image generated from the volume data set. To generate the output image 22 with an adjusted brightness therefore, windowing and/or rendering parameters, for example, do not have to be altered. With the method described, the basic type of display or visualization of the volume data set is therefore not altered, but only the resulting brightness of the output image 22 is adjusted in order to provide an optimum visibility of details. For example, it may be achieved that relatively dark vascular trees due to the use of relatively little contrast agent, for example, may be displayed with improved brightness, which also makes visible details that would typically not be visible using conventional methods without manual readjustment of the brightness due to the low amount of contrast agent used. Consequently, the necessity of a manual readjustment of the brightness may advantageously be avoided. Due to the advantageous simplicity of the method described, the method may be applied in real time in use or processing (e.g., when visualizing the volume data set) since modern data processing devices have sufficient computing power for this.

In an optional process act 12, the output image 22 that is generated may then be output to a display facility, for example, and consequently displayed to an observer. In one embodiment, the output ensues to a screen that is provided to display medical imaging data and meets the relevant standards. As a result thereof, it may be provided that the brightness of the output image 22, which has been adjusted using the present method, combined with the display or representation properties of the screen, allows an optimum detectability of the details of the output image 22.

FIG. 2 shows an original histogram 13 of the 2D image generated from the volume data set. For this, a brightness H is recorded on an abscissa and a number N of pixels is shown on an ordinate of the original histogram 13. Accordingly, an original brightness distribution 14 that characterizes the 2D image is depicted as a series of bars. The height or length of the individual bars indicates how many of the pixels in the 2D image have a brightness value that corresponds to the position of the respective bar on the abscissa. The threshold value 15 that therefore corresponds to a specific brightness value is marked. In the present case, the brightness values of all the pixels in the 2D image are lower than the threshold value 15. Accordingly, in the original histogram 13, there are therefore no entries in a range 16 above the threshold value 15. In other words, the 2D image does not include any pixels with brightness values higher than or equal to the threshold value 15.

In order to provide that a preset number or a preset portion of the pixels of the 2D image have brightness values that are equal to or greater than the threshold value 15, the brightness values shown in the original histogram 13 are multiplied by the relevant adjustment factor in order to fulfill this condition.

Figure 3:
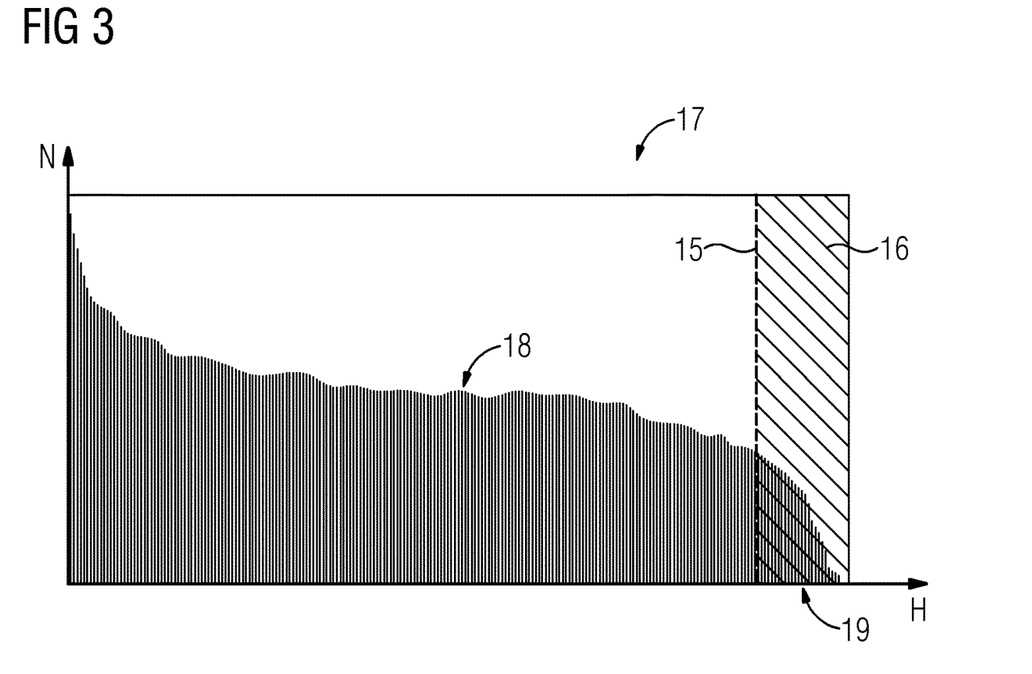
FIG. 3 shows the histogram from FIG. 2 after multiplication by an adjustment factor.

FIG. 3 shows in diagram form, a resulting brightness-adjusted histogram 17 that therefore corresponds to the original histogram 13 after multiplication of the original brightness distribution 14 by the adjustment factor. A resulting adjusted brightness distribution 18 is stretched compared with the original brightness distribution 14. There are brightness values 19 above the threshold value 15.

Figure 4:
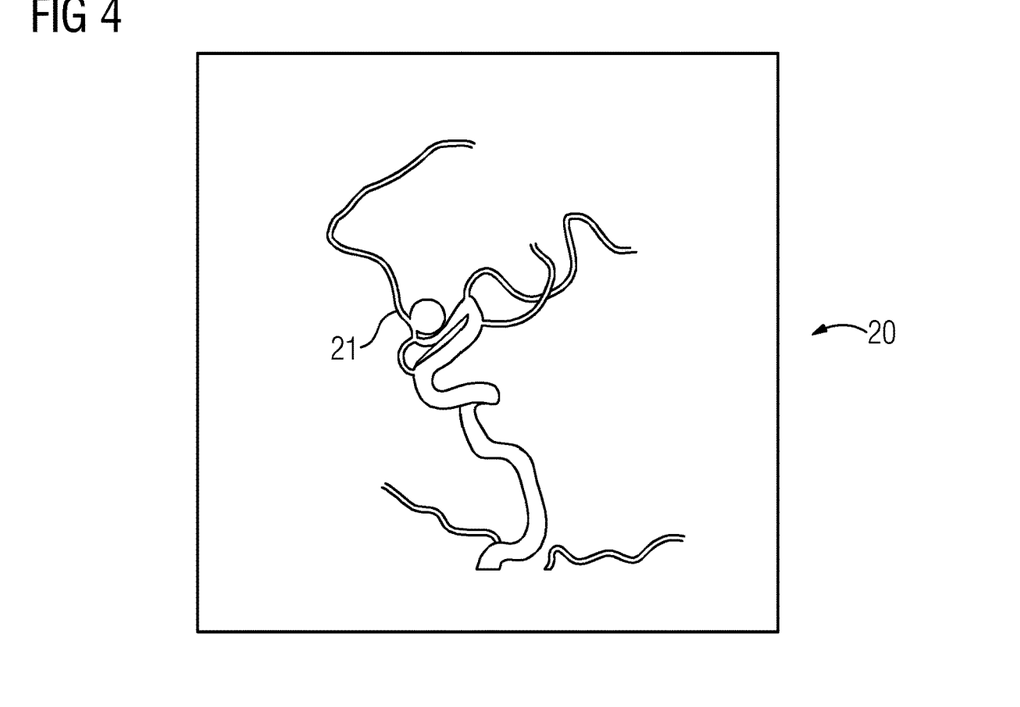
FIG. 4 shows an exemplary output image generated by a conventional method.

FIG. 4 shows in diagram form a conventional output image 20, generated by conventional methods, of a vascular tree 21. This may involve, for example, a subtracted reconstruction of the high contrast volume data set, for which relatively little contrast agent has been used or that was acquired after a relatively large time gap since the relevant injection of contrast agent. In such a case, an observer would have to readjust the brightness of the conventional output image 20 manually in order to make more details visible.

Figure 5:
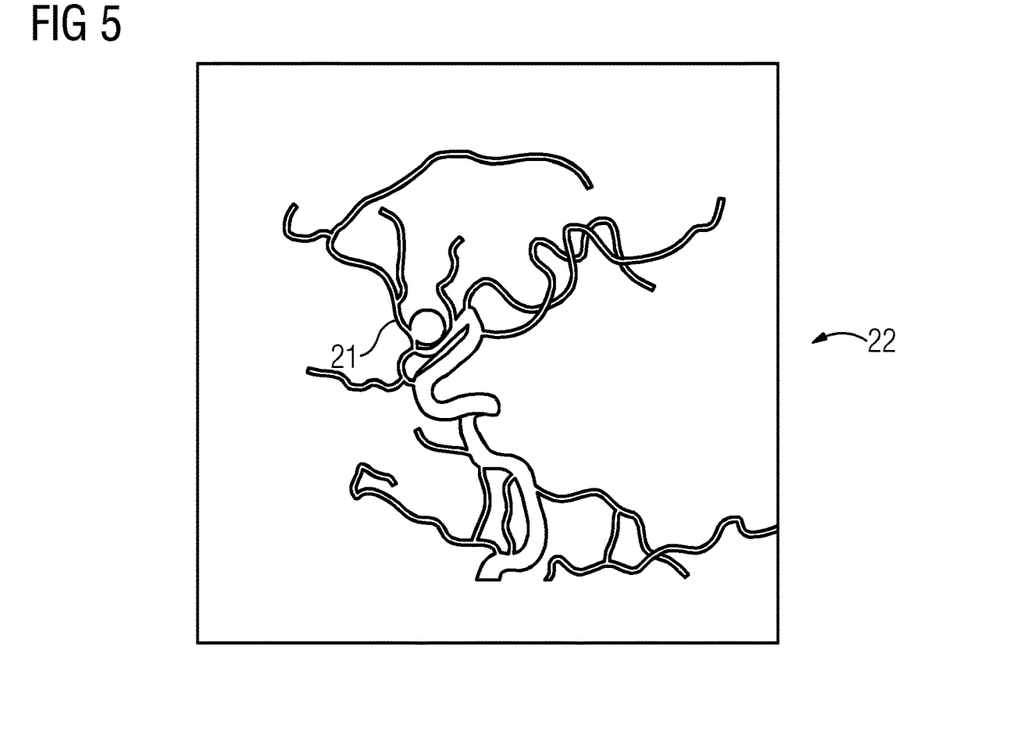
FIG. 5 shows the output image from FIG. 4 with brightness adjusted by the method according to an embodiment.

FIG. 5 shows a brightness-adjusted output image 22, the partial image of which corresponds with the conventional output image 20, but which, unlike this, was generated using the present method. Due to the automatically adjusted brightness, the relevant or interesting details of the vascular tree 21 are already visible without manual adjustment or readjustment of the brightness.

In the case of sparse volume data sets, which contain a relatively low portion of useful data that characterize the respective examination object (e.g., the vascular tree 21), the histogram-based procedure may be advantageously applied using the process acts 8 and 9 disclosed in FIG. 1. In such cases, a number of pixels that are intended to be shown relatively brightly may vary considerably as a function of a respective individual morphology of the vascular tree 21, the amount of contrast agent used, a brain region that has been examined, and an orientation of the volume data set.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for generating an output image from a volume data set that includes a plurality of voxels, the method comprising:
   generating a rendered 2D image from the volume data set, the generating of the rendered 2D image comprising volume rendering;
   determining an adjustment factor based on a brightness value of pixels in the rendered 2D image;
   generating a brightness-adjusted volume data set, the generating of the brightness-adjusted volume data set comprising multiplying a respective voxel brightness value of the plurality of voxels in the volume data set by the adjustment factor; and
   generating the output image using volume rendering from the brightness-adjusted volume data set.

2. The method of claim 1, further comprising determining a mean brightness value of pixels in the rendered 2D image, wherein determining the adjustment factor comprises calculating the adjustment factor as a ratio of a preset target brightness value to the mean brightness value.

3. The method of claim 2, wherein the preset target brightness value is automatically set as a function of a type of the volume data set.

4. The method of claim 3, wherein the preset target brightness value is selected from a preset number of different target brightness values.

5. The method of claim 1, further comprising generating a histogram that characterizes the brightness values of the 2D image,
   wherein determining the adjustment factor comprises determining the adjustment factor based on the histogram.

6. The method of claim 5, wherein determining the adjustment factor comprises determining the adjustment factor such that, through multiplication by the adjustment factor, a preset portion of the pixels in the 2D image have at least one brightness that corresponds to a preset threshold value.

7. The method of claim 6, further comprising automatically setting the preset threshold value, the preset portion of the pixels, or the preset threshold value and the preset portion of the pixels as a function of a type of the volume data set.

8. The method of claim 7, wherein automatically setting the preset threshold value, the preset portion of the pixels, or the preset threshold value and the preset portion of the pixels as a function of a type of the volume data set comprises selecting the preset threshold value, the preset portion of the pixels, or the preset threshold value and the preset portion of the pixels from a preset number of different threshold values, a preset number of portions of pixels, or a preset number of different threshold values and a preset number of portions of pixels, respectively.

9. The method of claim 1, further comprising generating a modified output image from the brightness-adjusted volume data set without renewed multiplication by the adjustment factor or by a different adjustment factor after the generation of the output image.

10. The method of claim 1, further comprising generating a plurality of rendered 2D images with different projection directions from the volume data set, the plurality of rendered 2D images comprising the rendered 2D image,
wherein determining the adjustment factor comprises determining the adjustment factor based on the brightness values of the pixels in the plurality of rendered 2D images.

11. An apparatus for generating an output image from a volume data set that includes a plurality of voxels, the apparatus comprising:
a data processor configured to:
generate a rendered 2D image from the volume data set, the generation of the rendered 2D image comprising a volume render;
determine an adjustment factor based on a brightness value of pixels in the rendered 2D image;
generate a brightness-adjusted volume data set, the generation of the brightness-adjusted volume data set comprising multiplication of a respective voxel brightness value of the voxels in the volume data set by the adjustment factor; and
generate the output image, the generation of the output image comprising a volume render from the brightness-adjusted volume data set.

12. The apparatus of claim 11, further comprising a control element configured to alter the adjustment factor accordingly when the control element is activated.

13. The apparatus of claim 11, wherein the data processor is further configured to determine a mean brightness value of the pixels in the rendered 2D image,
wherein the determination of the adjustment factor comprises calculation of the adjustment factor as a ratio of a preset target brightness value to the mean brightness value.

14. The apparatus of claim 13, wherein the preset target brightness value is automatically set as a function of a type of the volume data set.

15. The apparatus of claim 14, wherein the preset target brightness value is selected from a preset number of different target brightness values.

16. The apparatus of claim 11, wherein the data processor is further configured to generate a histogram that characterizes the brightness values of the 2D image,
wherein the determination of the adjustment factor comprises determination of the adjustment factor based on the histogram.

17. The apparatus of claim 16, wherein the determination of the adjustment factor comprises determination of the adjustment factor such that, through multiplication by the adjustment factor, a preset portion of the pixels in the 2D image have at least one brightness that corresponds to a preset threshold value.

* * * * *